Patented Dec. 17, 1929

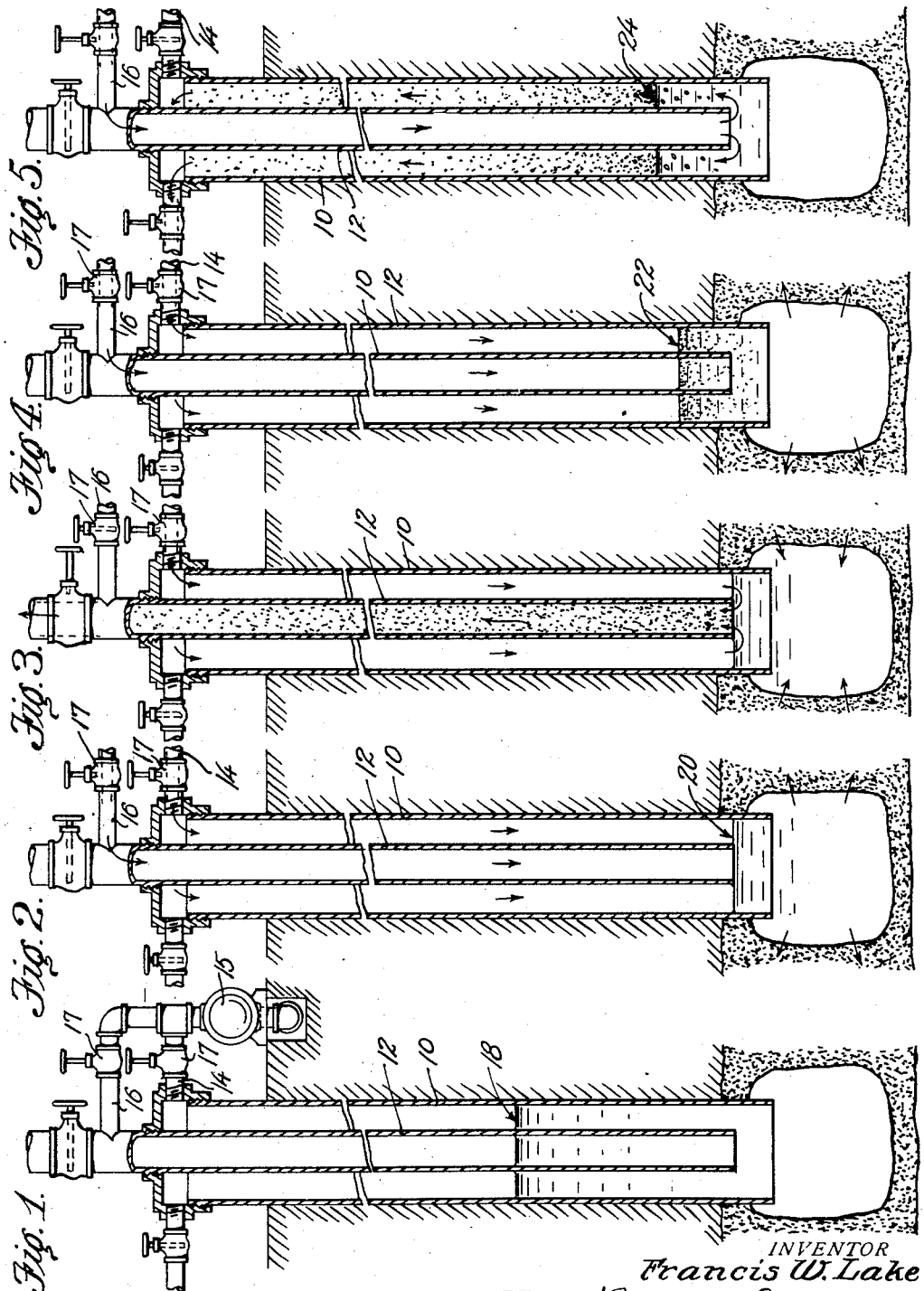

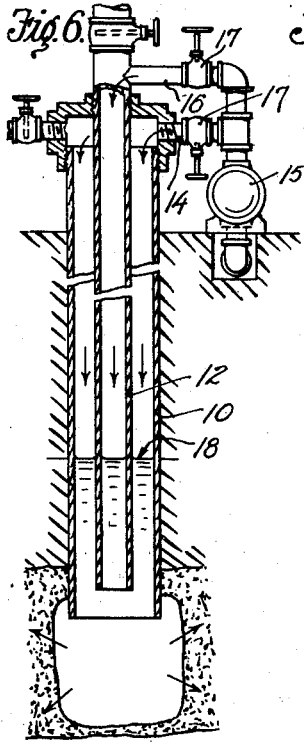
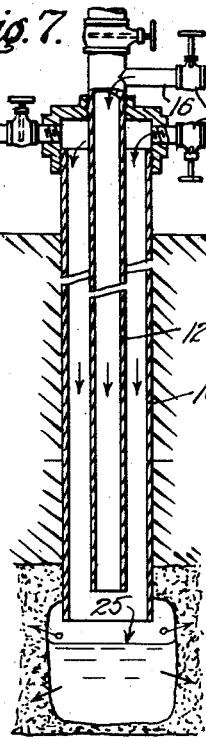
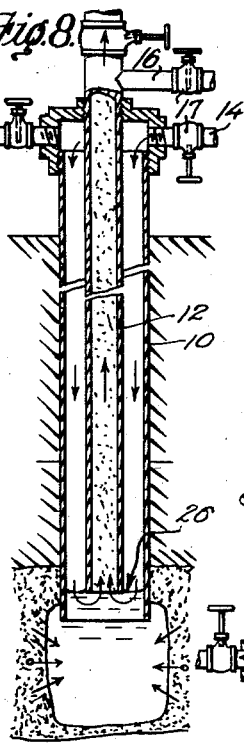
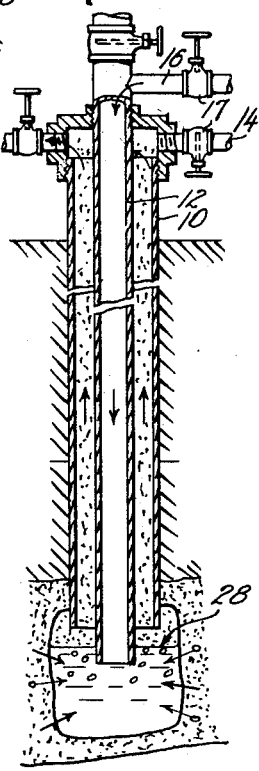
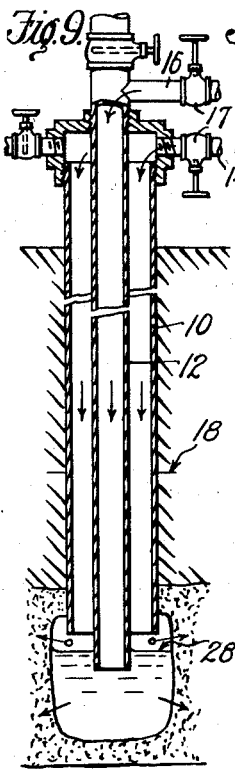
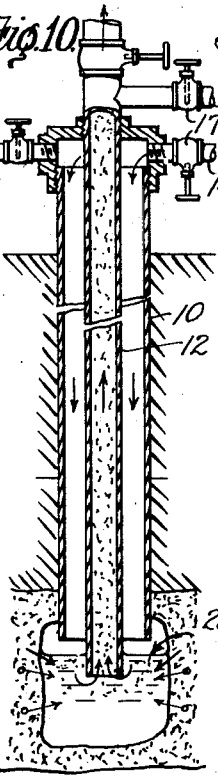
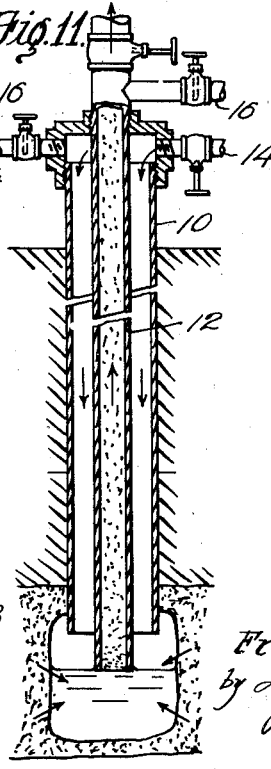

1,740,101

UNITED STATES PATENT OFFICE

FRANCIS W. LAKE, OF WHITTIER, CALIFORNIA, ASSIGNOR TO UNION OIL COMPANY OF CALIFORNIA, OF LOS ANGELES, CALIFORNIA, A CORPORATION OF CALIFORNIA

SIMULTANEOUS BALANCED-PRESSURE AND INJECTION METHOD FOR INITIATING GAS LIFT IN OIL WELLS

Application filed July 18, 1927. Serial No. 206,677.

This invention relates to the so-called "gas lift" method of flowing deep wells, particularly oil wells, and has been designed to overcome the excess hydrostatic head of oil which ordinarily accumulates in such wells prior to starting gas lift and which ordinarily cannot be removed by direct application of a reasonable gas pressure in attempting to initiate gas lift.

Gas lift, as now practiced, consists in passing gas under pressure into a well containing a flow tube, so that the gas passes around the lower end of the flow tube in a stream and in its passage atomizes the oil as fast as it is forced up to said tube end by the natural rock pressure in the well, the atomized oil being carried to the surface in the gas stream. The gas may be introduced either through the flow tube or through the casing, the atomized oil being discharged from the other of the two; however, it is preferred usually to introduce the gas into the casing and discharge the oil from the flow tube.

But, as above indicated, the initiation of gas lift usually offers difficulties, due to the fact that during a preceding period of idleness a relatively great hydrostatic head of oil has accumulated in the well hole, which head usually cannot be overcome by steady application of a moderate pressure to one side of the flow tube. This condition arises for the reason that, as pressure is applied to one side of the tube to depress the oil level therein, the hydrostatic head increases in the other side. While some of the oil is forced back into the formation (depending upon the viscosity of the oil, the friction of the formation, and the like) the effective rock pressure in the vicinity of the well increases until it is sufficient to balance the increased hydrostatic head. Thus, upon any attempt to start gas lift by straight application of pressure to one side in order to force over the entire excess load of accumulated oil and uncover the lower end of the tube for passage of gas thereunder, the hydrostatic head will increase until it reaches the maximum, that is, until it is equal to the entire height of the flow tube, which height may be as much as several thousand feet. Moreover, the pressure which would be high enough to start gas lift by such steady application, that is a "normal starting pressure," under these conditions, would be excessive for all other purposes, since when the oil level is lowered and gas lift started, normal continuation of gas lift may be and should be carried on with a much lower pressure, this being made possible by the much lower density of the gas-and-oil column in the flow tube during normal gas lift as compared with the oil before gas lift. Thus, it is clear that it is not convenient or desirable to maintain said excessive pressure merely for the purpose of overcoming said hydrostatic head.

The term "hydrostatic head" except where otherwise defined, is used throughout this case to mean the pressure of that portion of the oil body accumulated in the well hole, which stands as a column in the tube and casing above the lower end of the flow tube. When a well has stood idle for a short time (a few hours or a few days according to the well), the head will have reached substantially its maximum height and will be in substantial equilibrium with the rock pressure in the vicinity of the hole. The term "rock pressure" is used to signify the natural expulsive pressure which forces the oil into the well from the formation, and under the conditions just described approximately equals said hydrostatic head in the well hole. Obviously, then, in a non-flowing well under these conditions the said rock pressure or hydrostatic head is less than the static head represented by the length of the flow tube between its points of intake and discharge.

If gas under pressure be applied to the casing for example, of a well containing an accumulated head of oil, oil will be forced up into the tube, thereby increasing the static head therein, as above indicated. Of course, if the oil level stands sufficiently high in the well, the available gas pressure may elevate the oil in the tubing sufficiently to discharge some of the oil from the tubing without uncovering the lower end thereof, but discharge will cease as soon as the oil level becomes depressed to such a point that the head in the tubing above the oil level balances the gas pressure being applied.

In order to initiate gas lift by straight application of pressure, a "starting pressure" must be employed sufficient to depress the oil level low enough to allow the passage of gas under the tubing, this pressure being here termed the "normal starting pressure." Such a pressure must be at least equal to the increased static head thereby developed in the flow tube. This increased head of oil in the tubing is here termed the "normal starting head," and its magnitude is dependent upon the relative size of the tubing and casing, the amount and density and viscosity of the oil in the well, the rock pressure, the friction of the formation, etc. The "normal starting head" as the term is herein employed is defined as the "hydrostatic head" of oil in the flow tube above the point of admission to said flow tube at the time gas would break into the flow tube. In like manner, the "normal starting pressure" is defined as the gas pressure necessary to depress the oil level in the gas admission tube to the point of gas admission to the flow tube and sufficient to start gas lift in the flow tube when said pressure is applied to the surface of the oil in said gas admission tube. It is observed that the definition applies whether discharge flow is from the tube and gas application is through the casing, or vice-versa. If a gas tube is employed and is connected by a jet to the flow tube in a manner common to air or gas lift, the starting head or pressure may be equal to the hydrostatic head of the oil in the flow tube above the jet when gas is first forced into the gas tube, and it may be equal to or slightly greater than the hydrostatic head of oil above the jet when first applied.

Another important consideration is the fact that the oil body found in some wells is so heavy and viscous and so free from absorbed gas and other light constituents, that the natural flow into the well is sluggish, the oil does not atomize readily, and the static pressure of a given column is materially greater than that of a less heavy oil. Thus, this heavy, gas-free oil which is commonly termed "dead" oil also offers difficulties, especially when very "dead," that is, when containing no material quantities of light elements.

The present invention has for its general object, the depression of the oil level approximately to the lower end of the flow tube by the application of gas under a pressure approximating rock pressure but less than that required to initiate gas lift by a steady application to either the tube or the casing for lifting and discharging the oil column in the usual manner, i. e., less than the normal starting pressure. Another object of the invention is to enliven a "dead" oil body in the well and in the adjacent sands and reduce its viscosity in order to facilitate flow into the hole and establish gas lift.

These objects are attained by promoting the absorption by the oil, especially where the oil is "dead," of large amounts of gas (natural gas preferred), and by applying pressure preferably simultaneously to both the tube and the casing to depress the oil level to a point sufficiently low that gas lift will commence upon release of pressure on one side of the tube, the excess head being forced back into the formation. The pressure employed may be less than rock pressure but sufficient in conjunction with the oil head to depress the oil level to a point sufficiently low that upon release of pressure on one side of the tube the applied pressure will be sufficient to depress the remaining hydrostatic head on the other side to the lower end of the flow tube and to elevate the corresponding oil column on the released side until the gas will break around the lower end of the flow tube and cause discharge of said column of oil. Since considerable quantities of gas are absorbed by the oil while under pressure, initiation of gas lift is thereby facilitated, due to the lifting effects that are produced on the released side by the expansion of the absorbed and entrained gas, these effects increasing with the static pressure decrease as the oil approaches the top. When the gas pressure is about equal to rock pressure, simultaneous application thereof to the tube and casing will depress the oil level to the lower end of the tube and bare said tube end so that initiation of gas lift will take place immediately upon release of pressure on one side. As a further modification, a gas pressure considerably greater than rock pressure may be used, particularly where a "dead" oil is encountered. In this case the application of pressure is continued until the oil is forced back into the formation together with relatively great quantities of gas whereby absorption and entrainment of gas by the oil reduces the gravity and viscosity thereof. Then, when pressure is released on one side of the tube the enlivened oil flows more readily back into the well and is picked up by the gas stream and atomized as rapidly as it rises to the lower end of the tube, gas lift being thereby initiated and the oil level being thereby maintained at said tube end. While the pressure for this form of gas lift initiation must be greater than rock pressure, it need never be as great as would be required to entirely discharge the accumulated oil body from the flow tube by direct application of pressure to the casing.

Briefly stated, the invention above outlined for initiating gas lift, broadly comprises applying gas under pressure to the surface of oil in a well, to force at least a portion of the oil back into the formation, and then releasing the pressure on a part of the surface while maintaining it on another part. More particularly stated, the invention comprises applying a gas under pressure simultaneously to the casing and the flow tube until the pressure is substantially balanced on both sides, at least a portion of the oil head being forced back into the formation, and then releasing the pressure on one side and maintaining it on the other side. In a more specific form, the invention requires that the applied pressure be at least as great as the rock pressure in order to bare the lower end of the tube. In a further modification, the applied pressure is greater than rock pressure and the gas thereunder is introduced until the head of oil is forced back into the formation together with quantities of the gas sufficient to enliven the oil and reduce its specific gravity. Natural gas is preferred, and is particularly desirable in the last described form.

Subject matter disclosed herein but not claimed is covered in my co-pending applications, Serial Numbers 206,679 and 206,681.

The practice of the invention is diagrammatically represented in the accompanying drawings, wherein—

Fig. 1 indicates the level to which the oil body has risen in a well prior to undertaking gas lift;

Fig. 2 indicates the step of depressing the oil level both in the tube and in the casing to approximately the lower end of the tube by application of gas under pressure to both the tube and casing;

Fig. 3 indicates normal gas lift operation as set up when the pressure on one side is released;

Fig. 4 represents the form wherein the pressure is somewhat less than rock pressure and the oil level is depressed to a point somewhat short of the lower end of the flow tube;

Fig. 5 represents the operation when the pressure is released in the casing of Fig. 4;

Figs. 6, 7 and 8 indicate successive steps in initiating gas lift in wells where the oil is "dead" and where the lower end of the flow tube is positioned at or above the upper limit of the oil bearing sands;

Figs. 9 to 12, inclusive, represent successive steps in the initiation of gas lift in a well where the oil is "dead" and wherein the lower end of the flow tube lies below the upper limit of the sands.

The usual casing 10 containing the flow tube 12 is indicated as having a gas inlet 14 which connects with a compressor 15, the latter also having a connection 16 whereby gas may be introduced into the top of the flow tube, valves 17 being provided as necessary to control the gas flow. The oil is represented as having risen in the casing to the level 18.

In operation of the form indicated in Figs. 1 to 3, gas under pressure is applied both to the casing and to the tube, and it is assumed that the pressure is sufficient to force the oil back into the sands and depress the oil level to the lower end of the tube as indicated at 20 in Fig. 2, but not sufficient to overcome the hydrostatic head which would develop in the tube above the oil level in the casing if the pressure was applied to the surface of the oil in the casing while the tube was left open. The oil level having been depressed both in the casing 10 and in the tube 12 to the desired point adjacent the lower end of the tube, the pressure in the tube is released as indicated in Fig. 3 and the application of the pressure to the casing is continued through inlet 14, whereupon the gas rushes around the lower end of the tube as indicated by the arrow and in its passage atomizes the oil which rises to the tube's extremity, thereby establishing discharge by normal gas lift. Obviously, the pressure in the casing may be released and that in the tube maintained so that the oil may be discharged by way of the casing somewhat as indicated in Fig. 5 of the modification about to be described.

It is not always necessary, however, to depress the oil level entirely to the lower end of the tube. Instead, the level of the oil need be depressed only to such a point that the volume of oil remaining in the tube and casing above the lower end of the tube, will, when forced into either the tube or the casing, develop a hydrostatic head above the tube end less than equal to said pressure; then, when such point has been reached, one side may be released and the well will begin to flow. This condition is represented in Figs. 4 and 5, where the level in the tube and casing has been depressed to the point 22 in Fig. 4, and the line 24 in Fig. 5 represents the level to which the oil rises in the casing when all oil is expelled from the tube upon release of pressure in the casing, the hydrostatic head represented by the distance between the lower end of the tube and the line 24 being capable of being overcome by the pressure applied to the tube. In this instance, the gas passing under the lower end of the tube as indicated by the arrow will rise through the oil column in the casing thereby atomizing the same and causing flow by gas lift to be established by way of the casing and out through the connection 14. Obviously, a similar condition would be obtained by operating in the opposite direction.

Since the oil under gas pressure absorbs considerable amounts of gas and is thereby reduced in specific gravity, the hydrostatic head of a given column of oil will be correspondingly reduced by such absorption. This condition, therefore, will further limit the level to which it is necessary to depress the oil body. The value of absorption lies not only in the mere reduction of the specific gravity of the oil but also in the lifting properties of the absorbed gas which are developed as the gas expands in the upper portions of the rising column about to be discharged, this expansion occurring by reason of the rapid reduction of static pressure as the oil approaches the top.

While the available gas pressure ordinarily is applied to both the tube and the casing to its full value and is substantially balanced therein, this is not necessary, and even when so applied the readings on the pressure gauges usually show a variation of at least a few pounds.

Where flow is not finally established upon the first release of pressure, it is necessary to repeat the operation two or three times until the oil level is depressed far enough or sufficient amounts of gas are absorbed for the gas pressure to expel the excess head. Sometimes even when the level has not been sufficiently depressed, a quantity of oil will be forced over, but if the head of oil in the tube above the level in the casing becomes too great for the pressure, the flow will stop. Then upon release of pressure, in the casing or upon the restoration of pressure in the tube, the oil column falls, this movement resulting in further agitating and mixing the oil with gas to increase absorption, thereby increasing the probabilities of successful flow on the next attempt. In some cases, it may be necessary to force over several successive small amounts of oil before the oil level is lowered sufficiently for the gas to break around the lower end of the tube and establish continued flow.

To operate the method indicated by Figs. 6 to 12, a pressure greater than rock pressure is required. Fig. 6 indicates an oil well in which the flow tube terminates above the lower end of the casing and a body of "dead" oil has accumulated and risen to the level indicated at 18. Gas may be introduced under pressure either to the casing by way of the inlet 14 or to the flow tube by way of connection 16, but preferably and according to Fig. 7 the gas under pressure is introduced to both the tube and the casing simultaneously whereby the oil is depressed to the level indicated at 25, and gas and oil are forced back into the sands surrounding the hole. The gas under pressure is introduced in such quantities that the amount of gas absorbed by the oil is materially increased and introduction is continued until the oil body and surrounding sands have been thoroughly charged with gas both by absorption and by mechanical entrainment. Thus, the pressures in tube, casing and hole become approximately or exactly balanced. The step just described not only enlivens the oil in the hole but also frees the sands from clogging materials whereby subsequent flow of oil into the hole will be materially increased. After gas introduction has continued until the desired enlivening of the oil is thought to have been accomplished, the pressure in either the tube or the casing is released while that in the other is maintained, with the result that the gas-laden oil flows back into the hole and the introduced gas is caused to flow in a stream around the lower end of the flow tube, the lightened oil being thereby atomized as it rises to the flow tube and being conducted to the surface in the gas stream, thus establishing normal gas lift. In lieu of continuing flow of gas around the end of the tube until the oil level rises to the tube, the tube and casing may be closed in for a time to allow the oil to return to the hole in sufficient quantity. As indicated in Fig. 8, the pressure on the flow tube is released while that on the casing is continued whereby the gas stream flows around the lower end of the flow tube 12 and picks up and atomizes the oil flowing back into the hole from the formation and rising up to the lower end of said tube, the oil level being thereby maintained adjacent to said lower end as indicated at 26. In this manner, a body of very heavy oil may be treated by injection of gas into the well under pressure exceeding rock pressure, whereby gas lift may then be readily instituted.

In Figs. 9, 10, 11 and 12, the flow tube is shown as depending into the oil below the upper limit of the sands. In this case, when the pressure has been applied to the casing to depress the oil from the original level 18 to about the level 28, large quantities of the gas will pass back into the sands to thoroughly charge the oil contained therein, but in this case the available pressure may or may not be sufficient to entirely expel the head of oil from the flow tube. In either instance, the oil body and that in the surrounding sands will become sufficiently charged with gas that upon release of pressure in either the casing or tubing as indicated in Figs. 10 and 12, the pressure maintained on the other side will be sufficient to overcome the hydrostatic head of the remaining gas-charged oil and expel the same whereby normal gas lift is initiated and the level of the oil body is established at the lower end of the flow tube as seen in Fig. 11.

It should be noted that the absorption of gas is produced not only under the mechanical mixing of the gas with the oil as the gas is pumped back into the sand, but absorption of large quantities of gas is caused by the continued application of the high pressure under which the gas is introduced into the well. Thus, all of these influences work together to cause the absorption and entrainment of such quantities of gas that enlivening of the oil body in this fashion is a simple proceeding and makes the initiation of gas lift relatively easy where the application of normal methods for instituting gas lift would not be successful. Gas lift having been initiated, continuation thereof may be had with a lower gas pressure than that used for starting.

In all forms, the introduction of gas under pressure by means of the compressor 15, may be replaced with gas from an adjacent well wherever such gas may be obtained under a sufficiently high pressure, the control of such introduction being managed in the same fashion as above described.

As examples of the manner of practicing the invention, referring to the form of Figs. 1 to 5, it was found impossible to produce flow by straight application of gas at 500#  pressure to one side; but after applying 350# to both sides of the tube to depress the oil level as far as possible the well began to flow upon release on one while continuing gas introduction on the other side, and gas lift was thereafter maintained with 200#. In connection with the injection form of the invention, the oil was so heavy that 480# would not overcome the head by straight application, but by introducing gas into the formation at 225# (this being higher than rock pressure) for nine hours and then releasing the flow tube the well began to flow and gas lift was continued at about 200#.

The above disclosures, however, are to be considered merely as illustrative of the generic invention and not as limiting, since many variations obvious to those skilled in the art may be made within the scope of the following claims.

I claim:

1. A method for establishing gas lift in an oil well containing a body of dead oil into which a flow tube depends, comprising introducing into the well alongside the flow tube quantities of gas under pressure greater than the rock pressure in the immediate vicinity of the well and releasing the pressure on one side of the flow tube while continuing it on the other side.

2. A method for initiating gas lift in an oil well into which a flow tube depends and wherein a body of heavy oil has accumulated, comprising introducing into the well alongside the flow tube quantities of gas under a pressure greater than the surrounding rock pressure, continuing the introduction of gas until an appreciable quantity of said oil body has been forced back into the formation and until an appreciable quantity of gas also has been forced back into the sands to liven up the oil, and then releasing the pressure on one side of the tube while maintaining it on the other to cause the discharge of oil from the well.

3. A method for establishing gas lift in oil wells comprising applying to the oil surface a soluble gas under pressure simultaneously within the well casing and within a flow tube in the casing until the pressure is balanced on both sides of the flow tube and the lower end of the tube is bared, then releasing the pressure on one side of the flow tube while maintaining it on the other side of the flow tube.

4. A method for establishing gas lift in an oil well in which a quantity of oil has accumulated, comprising applying a soluble gas under pressure greater than rock pressure to the oil surface within the well casing and within a flow tube in the casing simultaneously until the pressure is substantially balanced on both sides of the flow tube and the oil is caused to absorb large quantities of gas, then releasing the pressure on one side of the tube while maintaining it on the other side.

5. A method for initiating gas lift in an oil well in which a quantity of oil has accumulated comprising simultaneously applying a gas to the oil surface within the well casing and within a flow tube in the casing under a pressure to depress the oil level in both the tube and casing, and then releasing the pressure on one while maintaining it on the other.

6. A method according to claim 5 wherein the gas pressure is less than the hydrostatic head represented by the length of the flow tube between its lower end and its point of discharge.

7. A method for establishing gas lift in an oil well having a casing and containing a body of oil into which a flow tube depends, comprising applying a soluble gas under pressure to both sides of the tube simultaneously until the pressure is substantially balanced on both sides, and then releasing the pressure on one side while continuing it on the other.

8. A method for initiating gas lift in a well having a casing and containing a body of accumulated oil into which a flow tube depends, comprising applying a soluble gas simultaneously to both sides of the tube under pressure sufficient to cause introduction of such gas into the oil-bearing strata, and then releasing pressure on one side of the tube while maintaining it on the other side.

9. A method for initiating gas lift in an oil well containing an accumulated body of heavy oil into which a tube depends, comprising applying a soluble gas to the well alongside the tube under pressure sufficient to cause its introduction into the oil-bearing strata, introducing said gas in sufficient quantities to cause absorption and entrainment of large quantities of gas by the oil to lighten the oil and reduce its viscosity, and then releasing the pressure on one side of the tube.

10. A method of initiating gas lift in an oil well having a casing element in which a flow tube element depends, which comprises introducing gas into said elements under pressure sufficient to cause introduction of gas into the oil-bearing strata of the well, and suddenly releasing said pressure in one of said elements and maintaining the pressure in other of said elements.

Signed at Los Angeles, in the County of Los Angeles, and State of California, this 12th day of July, A. D. 1927.

FRANCIS W. LAKE.